June 14, 1949.

C. G. DAHM 2,473,469

METHOD AND APPARATUS FOR MINIMIZING THE
HORIZONTALLY-TRAVELING COMPONENTS
OF SEISMIC WAVES

Filed April 10, 1948

INVENTOR
CORNELIUS G. DAHM
BY Sidney C. Johnson
ATTORNEY

Patented June 14, 1949

2,473,469

UNITED STATES PATENT OFFICE 2,473,469

METHOD AND APPARATUS FOR MINIMIZING THE HORIZONTALLY-TRAVELING COMPONENTS OF SEISMIC WAVES

Cornelius G. Dahm, Dallas, Tex., assignor, by mesne assignments, to Socony-Vacuum Oil Company, Incorporated, New York, N. Y., a corporation of New York Application April 10, 1948, Serial No. 20,233

4 Claims. (Cl. 177—352)

1

This invention relates to seismic prospecting, and particularly to geophone spread arrangements suited to obtain valuable seismic information despite unfavorable condition of the subsurface terrain.

In general, in seismic prospecting a charge of explosive is detonated at or below the surface of the earth and the resulting seismic waves, as reflected from subterranean strata, are detected by a spread of geophones, or equivalent detector devices, whose electrical outputs are impressed upon a multi-trace seismograph to produce a record which may be analyzed in determination of the depths and contours of the strata. In areas where hard rock is at or near the earth's surface, the seismic records obtained with the usual geophone arrangements yield little or no information of value because of high noise level throughout the frequency range of the reflected energy. It has been determined that a considerable amount of most of this noise energy picked up by the geophones travels horizontally and at quite constant velocity in a given area.

In accordance with the present invention, there are utilized several pairs of geophones for the production of each record trace; the detectors of each pair are suited, by their horizontal spacing, by the phasing of their individual outputs and by an associated filtering and mixing means, to provide a joint output in which is predominant the reflected wave energy; horizontally traveling energy the same frequency as that of reflected energy having been eliminated as the spacing of the geophones affects them in phase opposition. The spacing of the geophones is different for the different pairs so that collectively their outputs cover the entire band of seismic frequencies. By combining the outputs of these pairs of geophones in a single recorder circuit, there is produced a trace of the reflected waves to the substantial exclusion of much stronger horizontally traveling waves.

Further and preferably in accordance with the invention, the complete record resulting from a single explosion comprises a plurality of traces each produced as above stated: to that end, there are utilized several geophone spreads, each comprising several pairs of equally spaced geophones, the output of each pair of one spread being combined, as above briefly described, with the outputs of corresponding pairs of the other spreads, the record containing reflected waves to the exclusion of horizontally traveling waves.

The invention further resides in the methods and systems hereinafter described and claimed.

2

For a more detailed understanding of the invention, reference is made to the accompanying drawings in which.

As above briefly stated, when hard rock is at or near the earth's surface, the records obtained are usually of little value because the reflected waves are completely obscured by noise due to much more intense horizontally traveling waves produced by the same explosion. It has been determined this horizontally traveling energy moves at more or less constant velocity, of the order of about 6,000 feet per second, and this constancy, as will hereinafter appear, is taken advantage of in elimination or minimization of the disturbing effect of this horizontally traveling energy upon the record of the reflected waves.

By recourse to narrow band-pass filters, it is possible under these adverse circumstances to detect the reflected waves. It is necessary, however, that they pass only a very restricted band within a range in which the reflection-to-noise ratio is favorable; because the band-width is narrow, the reflections, though they may appear, resemble sine waves in appearance, and do not have such distinctive character that the reflected waves from different strata can be distinguished. This expedient is, therefore, unsatisfactory.

The record to be of value in seismographic exploration must be free of obscurement by horizontally traveling waves and yet must preserve the identity of the waves reflected from the various strata.

Figure 1:
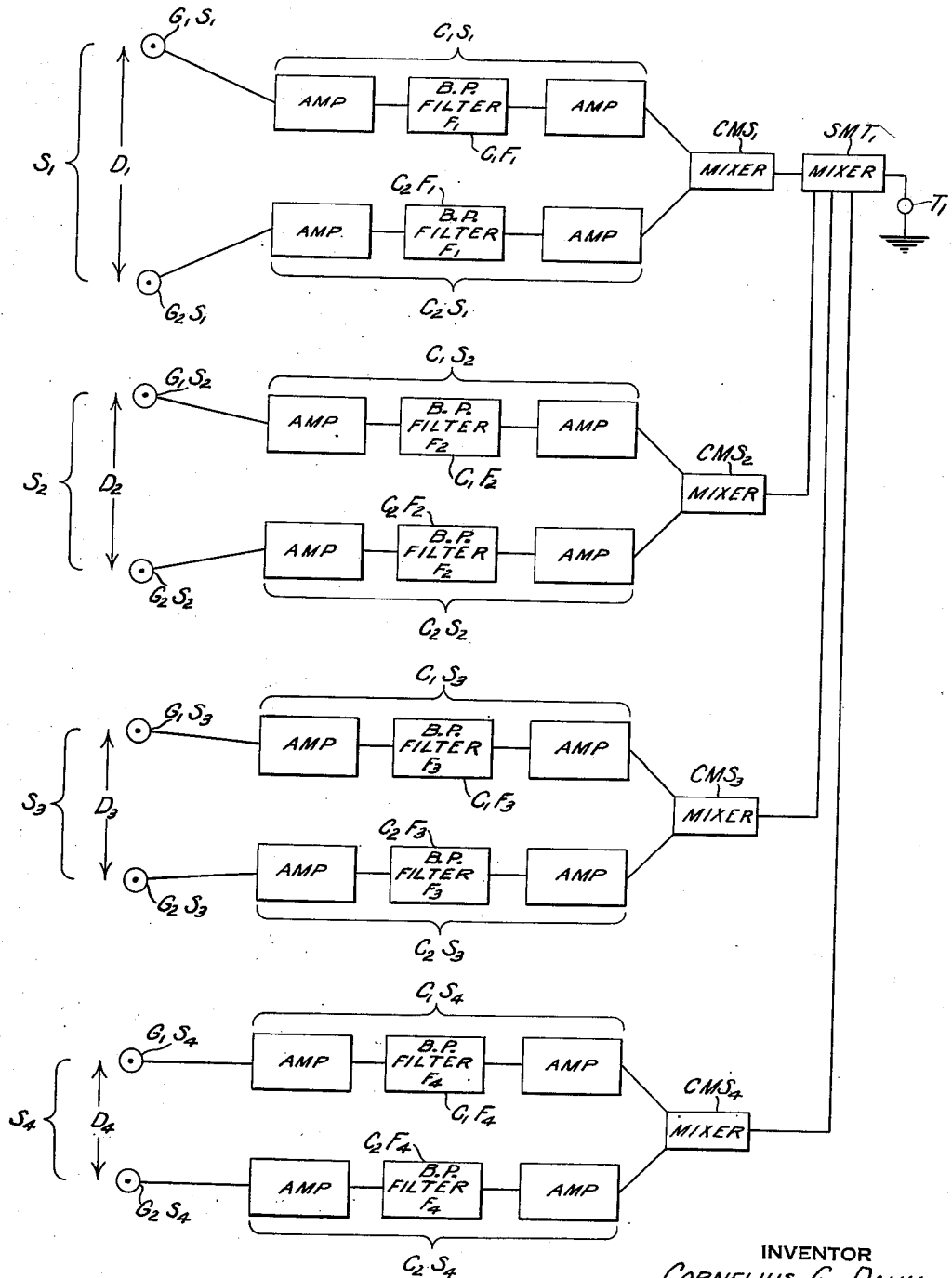
Fig. 1 is a block diagram showing a geophone arrangement and associated circuit components for producing a single record trace of reflected seismic waves.

Referring to Fig. 1, the geophone arrangement there shown as exemplary of a simple form of the invention comprises four spreads $S_1$—$S_4$, each comprising at least one pair of geophones. For simplicity of explanation, in discussion of Fig. 1, each spread will be described as though consisting of only one pair of geophones, but as will later appear in discussion of Fig. 5, the relations discussed in connection with each pair of geophones of a spread equally apply to other pairs of geophones of the same spread.

Considering first the spread $S_1$: the geophones $G_1S_1$ and $G_2S_1$ are horizontally separated in or along the earth by a distance $D_1$ corresponding to an odd number, usually one, of half-wavelengths at a particular seismic frequency $F_1$. In the amplifier channel $C_1S_1$ for geophone $G_1S_1$, there is included a band-pass filter $C_1F_1$ which is peaked at frequency $F_1$. Frequencies somewhat higher than and somewhat lower than this frequency are substantially attenuated so that the output of this channel is confined to a narrow band of frequencies including frequency $F_1$. The output energy of channel $C_1S_1$ has two components, one corresponding with the reflected wave energy, and the other corresponding with the horizontally traveling wave energy.

Similarly, the amplified channel $C_2S_1$ for the other geophone $G_2S_1$ of the pair also includes a narrow band-pass filter $C_2F_1$ peaked at frequency $F_1$. The output of channel $C_2S_1$ therefore comprises only energy having frequencies in the immediate neighborhood of frequency $F_1$; part of this energy is due to the reflected waves, but a larger part of it is due to the horizontally traveling waves.

The outputs of the two amplifier channels $C_1S_1$ and $C_2S_1$ of the spread $S_1$ are impressed upon a mixer $CMS_1$. As the geophones $G_1S_1$ and $G_2S_1$ are spaced by one-half wavelength at the frequency $F_1$, the horizontally traveling wave energy actuates them 180 degrees out of phase, with the result that the components of the signals of the two channels $C_1S_1$ and $C_2S_1$, which correspond with the horizontally traveling wave energy, are cancelled out in the mixer $CMS_1$. The reflected wave energies, however, are in phase in the signal outputs of the geophones $G_1S_1$ and $G_2S_1$, so that in the mixer $CMS_1$ the reflected wave components of the signals of the two channels $C_1S_1$ and $C_2S_1$ are additive or in phase.

The horizontal separation between the pair of geophones $G_1S_2$ $G_2S_2$ of the second spread $S_2$ is different from that of the separation between the geophones of spread $S_1$ and corresponds with an odd number of half-wavelengths at another seismic frequency $F_2$. Each of the band-pass filters $C_1F_2$, $C_2F_2$, respectively included in the geophone channel $C_1S_2$ and $C_2S_2$, are designed to cut off or attenuate all frequencies somewhat higher and somewhat lower than frequency $F_2$. Consequently, the individual signal outputs of channels $C_1S_2$ and $C_2S_2$ include only a band of frequencies in the neighborhood of frequency $F_2$. Some of the output energy of each of the channels corresponds with that of reflected waves and the remainder or major portion corresponds with that of the horizontally traveling waves. Again, however, generally as above discussed in connection with spread $S_1$, the components of the signals due to the horizontally traveling waves cancel out because as introduced into the mixer $CMS_2$ they are in phase opposition, whereas the signal components due to the reflected wave energies are there in phase or additive.

The spacing $D_3$ between the pair of geophones $G_1S_3$ and $G_2S_3$ of the third spread $S_3$ is different from that of spreads $S_1$ and $S_2$ and is an odd number of half-wavelengths at another seismic frequency $F_3$. The filters $C_1F_3$ and $C_2F_3$, respectively associated with the geophone channels $C_1S_3$ and $C_2S_3$, each pass a band of frequencies in the neighborhood of frequency $F_3$. Accordingly, those fractions of the outputs of the geophone channel $C_1S_3$ and $C_2S_3$ due to the horizontally traveling wave energy are in effect cancelled in the mixer $CMS_3$, whereas the reflected wave components of those signals are additive.

Similarly, the spacing $D_4$ between the geophones $G_1S_4$ and $G_2S_4$ of the fourth spread $S_4$ corresponds with an odd number of half-wavelengths at still another seismic frequency $F_4$. Frequencies somewhat higher than and lower than the frequency $F_4$ are substantially attenuated in each of the geophone channels $C_1S_4$ and $C_2S_4$ by the band-pass filters $C_1F_4$ and $C_2F_4$. Accordingly, the signal outputs of these two channels are substantially only a narrow band including frequency $F_4$; some of the energy is due to reflected waves and the remainder or major portion is due to the horizontally traveling waves. Because of the geophone spacing, the signal components due to the horizontally traveling energy are in phase opposition at mixer $CMS_4$ and so are cancelled, whereas, the signals due to the reflected waves, are substantially in phase.

The outputs of the mixers $CMS_1$, $CMS_2$, $CMS_3$ and $CMS_4$ of the four spreads $S_1$—$S_4$ are combined in the inter-spread mixer $SMT_1$. The output of the mixer $SMT_1$ is impressed upon the trace circuit $T_1$. As the output of the inter-spread mixer includes all of the significant seismic wave frequencies and as all of the energies of the horizontally traveling waves of those same frequencies have been minimized or eliminated, the trace includes the identifying characteristics of the reflected waves and clearly shows them without obscurement by the much more intense horizontally traveling waves.

Figure 2:
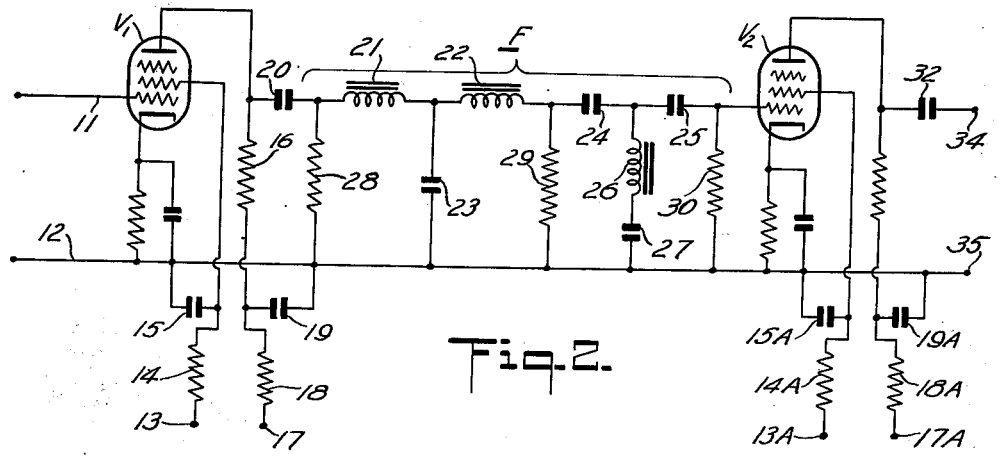
Fig. 2 is a schematic diagram of a filter network and associated tubes used in the geophone channels of Figs. 1 and 5.

Each of the band-pass filters $C_1F_1$—$C_2F_4$ may be of any suitable type having proper circuit constants and elements to obtain the desired narrow band-pass effect; specifically, the filter networks may be of the ladder type or of the type using coupled tuned circuits. The circuit constants, of course, are different for the filters of the different spreads, in each case selectively to pass frequencies corresponding with the geophone spacing of the same spread. The filter network F, Fig. 2, is generically illustrative of a suitable form of filter network for any of the band-pass filters of Figs. 1 and 5. More particularly, the input conductors 11 and 12 of Fig. 2 extend from the associated geophone or from an amplifier interposed between it and the tube $V_1$. Preferably, and as shown, the tube $V_1$ may be of the pentode type in order that a control voltage may be applied to the suppressor grid, generally as disclosed in U. S. Patent 2,408,001, to vary the channel gain as a function of time subsequent to the shot or explosion which initiates the reflected waves of interest. The screen grid or #2 grid of the tube $V_1$ is connected to the terminal 13 of a suitable source of direct current voltage, preferably through a filter comprising resistance 14 and condenser 15 to prevent interstage reaction. The anode of tube $V_1$ is connected to the terminal 17 of a suitable source of higher direct current through a filter network comprising resistance 18 and condenser 19 to avoid intercircuit reaction. The anode circuit of tube $V_1$ includes the load resistor 16 coupled to the filter F by a condenser 20. The filter F comprises one or more low-pass sections, each comprising series inductances 21—22 and an intermediate shunt capacitor 23. The filter F also comprises one or more high-pass sections, each including series condensers 24 and 25 and a shunt leg including in series an inductance 26 and a capacitor 27. As well understood by those skilled in the filter art, the circuit constants of the filter sections are selected to cut off frequencies higher and lower than the narrow band of frequencies to be passed by the filter. The resistors 28, 29 and 30 are of values selected in dependence upon the circuit constants properly to terminate the filter in avoidance of standing waves in the filter.

As above stated, the filters of each spread are designed to pass only a narrow band of frequencies whose mean frequency is determined by the spacing between a pair of geophones of the same spread. The composite of the frequency-selective characteristics of each group of filters (one from each spread) covers substantially the range of seismic reflection frequencies. The output of filter F is impressed on the control grid of tube $V_2$, the output of which is coupled through the circuit comprising condenser 32 and conductors 34 and 35 to the mixer $CMS_1$.

Figure 3:
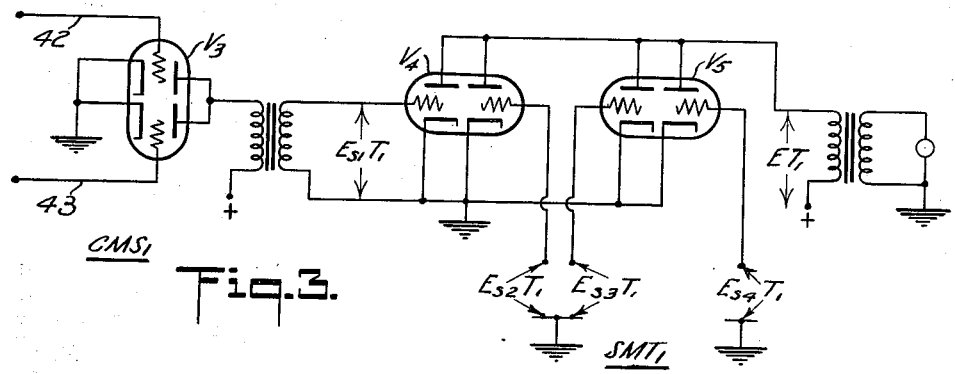
Figs. 3 and 4 are schematic views of mixer circuits usable in the systems of Figs. 1 and 5.

The inter-channel mixers $CMS_1$—$CMS_4$ may be of any suitable known type: each, for example, may be of the type generically represented by the mixer $CMS_1$ of Fig. 3 including a dual-triode tube $V_3$ such as 6C8. The lead 42 extends from one of the grids of tube $V_3$ to the output transformer or equivalent of one of the geophone channels, for example, of channel $C_1$ of spread $S_1$, and the lead 43 from another grid of the tube $V_3$ extends to a similar output element of the other of paired channels, for example, channel $C_2$ of the same spread $S_1$. The output voltage $E_{S_1 T_1}$ of the mixer, as appearing, for example, across the secondary of its output transformer, is therefore a function of or corresponds with the vector summation of the voltages $E_{c_1}$ and $E_{c_2}$. As previously explained, these voltages each include one component corresponding with the reflected waves within the band of frequencies passed by the channel filter and a second component corresponding with the horizontally traveling waves within the same band of frequencies. As the second component of these voltages as applied to the grids of tube $V_3$ are substantially equal and 180° out of phase, because of the geophone spacing, they cause little or no change in the anode currents of tube $V_3$ and the output voltage $E_{S_1 T_1}$ of the mixer is substantially free of any component due to the horizontally traveling waves. The reflected wave components of the voltages $E_{c_1}$ and $E_{c_2}$ on the contrary are substantially in phase and so cause cumulative change in the anode current.

Figure 4:
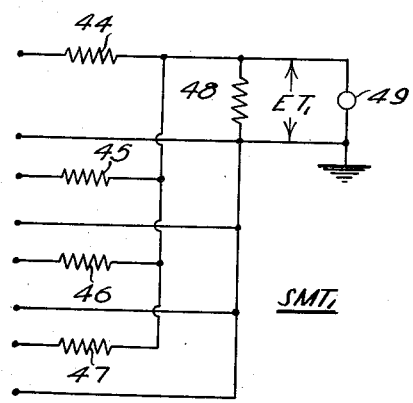

The inter-spread mixer $SMT_1$, Fig. 1, for combining the outputs of the mixers $CMS_1$—$CMS_4$ may also be of any suitable known type: each may be of the type generically represented by the mixer $SMT_1$, of Fig. 3 or of Fig. 4. In the particular four-spread system shown two dual-triodes $V_4$ and $V_5$ may be used for the mixing. In the circuit of Fig. 3, the output voltages of the channel mixers $CMS_1$—$CMS_4$ are respectively impressed upon the grids of the spread-mixer tubes, $V_4$ and $V_5$. In Fig. 4, the output voltages of channel mixers $CMS_1$—$CMS_4$ are mixed in the resistance network which includes resistances 44—48 connected to recording element 49. The result in both Fig. 3 and Fig. 4 is that the output voltage $E_{T_1}$ of the spread mixer $SMT_1$, includes all of the seismic wave frequencies and corresponds only with the reflected wave energies picked up by one pair of geophones of each of the spreads. All of the frequencies of the reflected waves are included because of the overlap of the frequency-selective curves of the filters $C_1F_1$—$C_2F_4$. The disturbing effects of the strong horizontally traveling waves within the same range of frequencies are suppressed or entirely eliminated by the above described spacing of the geophones of each pair, the filters associated with each pair, and the channel mixers.

Figure 5:
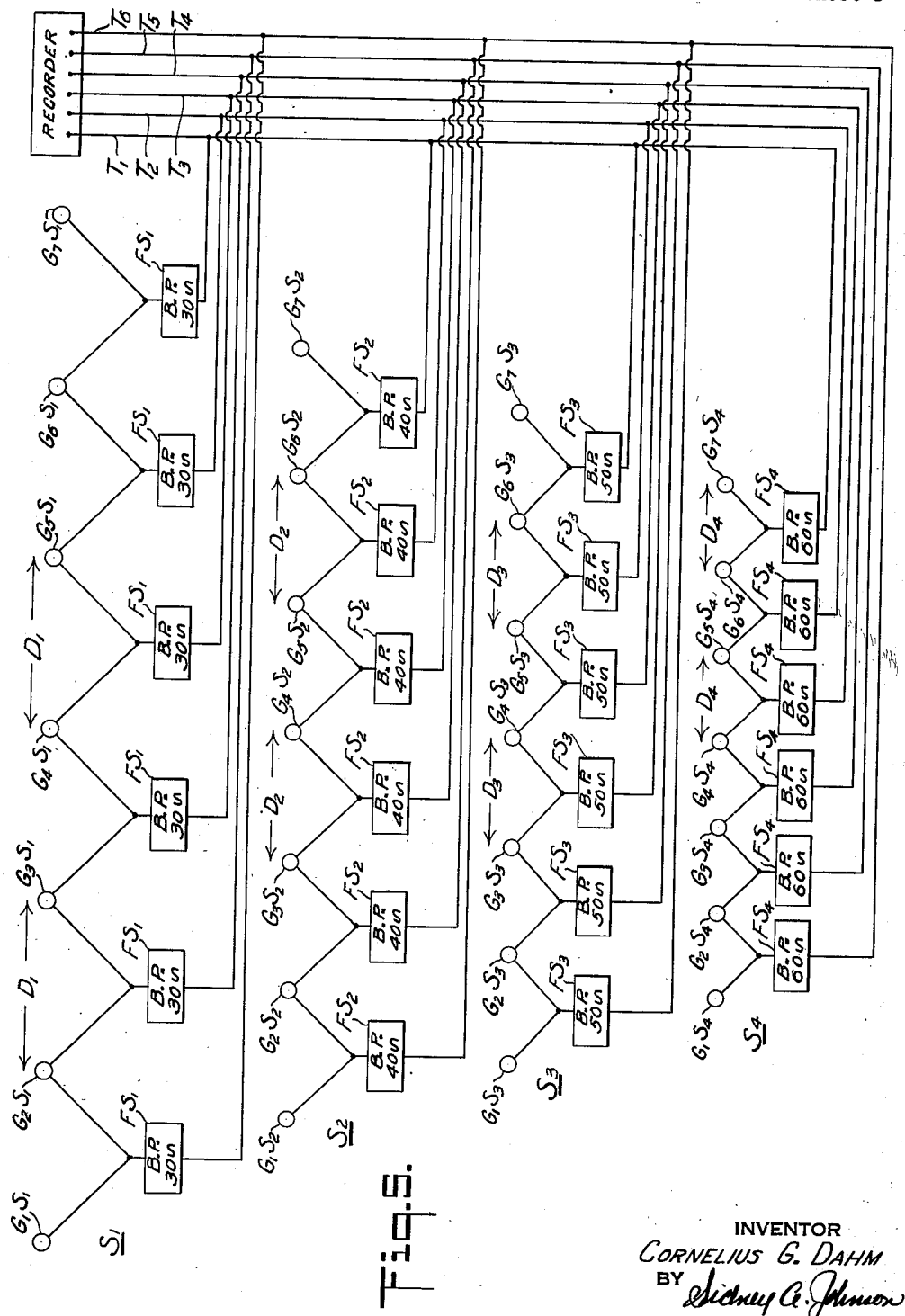
Fig. 5 is a simplified block diagram of a geophone arrangement producing a multi-trace record of reflected seismic waves.

To produce a multi-trace record, each spread, as shown in Fig. 5, includes a plurality of pairs of geophones or equivalent seismic detectors. The spacing between each of the several pairs of geophones of the same spread is the same and is different from the spacing between the geophones of the other spreads. Moreover, the band-pass filters associated with the pairs of geophones of a particular spread are all similar in that they pass the same band of frequencies whose mean frequency corresponds with the geophone spacing of that spread.

Specifically, the spacing $D_1$ between the pairs of geophones $G_1S_1$—$G_7S_1$ of spread $S_1$ may be 100 feet corresponding with a half-wavelength at a frequency of 30 cycles which is the mean frequency of the band passed by the filters $F_{S_1}$ of spread $S_1$; the spacing $D_2$ between each pair of the geophones $G_1S_2$—$G_7S_2$ of spread $S_2$ may be 75 feet corresponding with a half-wavelength at a frequency of 40 cycles which is the median frequency of the band passed by the filters $F_{S_2}$ of spread $S_2$; the spacing $D_3$ between each pair of the geophones $G_1S_3$—$G_7S_3$ of spread $S_3$ may be 60 feet corresponding with a half-wavelength at a seismic frequency of 50 cycles which is the median frequency of each of the band-pass filters $F_{S_3}$ of spread $S_3$; and the spacing $D_4$ between each pair of geophones $G_1S_4$—$G_7S_4$ of spread $S_4$ may be 50 feet corresponding with a half-wavelength at a frequency of 60 cycles which is included in the band passed by filters $F_{S_4}$ of spread $S_4$.

The particular system shown in Fig. 5 produces a six-trace record, but it shall be understood the number of geophones in each spread may be increased or decreased to obtain a correspondingly larger or smaller number of concurrent record traces. In this connection, it is pointed out that the number of geophones may be and preferably is less than twice the number of pairs of geophones; as shown in Fig. 5, each of the geophones, except the ones at the ends of the spreads, is connected to two channels. Further, it is to be noted that the geophones $G_4S_1$, $G_4S_2$, $G_4S_3$ and $G_4S_4$ are centrally located in their respective spreads $S_1$—$S_4$ and in such an arrangement they may be replaced by one geophone electrically common to all four spreads $S_{1-4}$. For the particular example cited above for illustration purposes where geophone spacings were 100 feet, 75 feet, 60 feet and 50 feet for the different spreads, $G_4S_1$ would also serve as $G_4S_2$, $G_4S_3$ and $G_4S_4$; $G_2S_2$ as $G_1S_4$; $G_3S_1$ as $G_2S_4$; $G_5S_1$ as $G_6S_4$; and $G_6S_2$ as $G_7S_4$ in which case 21 geophones would be electrically equivalent to the 28 geophones shown in Fig. 5.

It shall also be understood the number of spreads may be increased or decreased though about four, as shown, are preferred.

Though omitted for simplicity in Fig. 5, it shall be understood that with each pair of geophones of each spread there shall be a two-channel mixer and that with the two-channel mixers of the corresponding pairs of geophones of the several spreads there shall be associated an inter-spread mixer, one for each trace circuit ($T_1$—$T_6$, Fig. 5). In other words, the arrangement shown in Fig. 1 is in effeffct duplicated for each additional trace to be made. The number of channel filters may be reduced by using one filter for each pair of channels: for example, the filters $C_1F_1$ and $C_2F_1$ of Fig. 1 may be replaced by a single filter having the same frequency selective characteristic preferably disposed between the channel mixer CMS₁ and the associated spread mixer SMT₁.

While a preferred embodiment of the invention has been described, it will be understood that modifications may be made within the scope of the appended claims.

What is claimed is:

1. In a system for seismic prospecting, an arrangement of seismic wave detectors comprising pairs of detectors, the detectors of each pair being horizontally spaced from one another at distance corresponding with an odd number of half-wavelengths at a predetermined seismic-frequency different for the different pairs of detectors, output circuits for each of said pairs respectively including filter means selectively to pass the frequency corresponding with the spacing between the detectors of that pair, and a recorder circuit connected to said output circuits to produce a record trace of reflected seismic waves having said predetermined frequencies and substantially free of horizontally traveling waves having said predetermined frequencies.

2. In a system of seismic prospecting, a plurality of geophone spreads, each spread comprising geophones horizontally spaced at distance corresponding with an odd number of half-wavelengths at a predetermined seismic frequency different for the different spreads, a plurality of output circuits, one for each pair of geophones of each spread and respectively including filter means selectively to pass the frequency corresponding with the spacing between the geophones of that pair, and a plurality of recorder circuits each including the output circuits of a pair of geophones of each spread.

3. In seismic prospecting, the method of minimizing confusion of the record of reflected seismic waves by co-existent horizontally traveling waves which comprises arranging geophone spreads with the horizontal spacing between the geophones of each spread corresponding with an odd number of half-wavelengths at a predetermined seismic frequency different for the different spreads, combining in phase the reflected wave outputs of each pair of geophones of each spread having the frequency corresponding with their spacing, and combining the joint output of each pair of geophones of one spread with the joint output of a pair of geophones of each of the other spreads.

4. In seismic prospecting, the method which comprises arranging a plurality of geophones as different spreads with the horizontal spacing between the geophones of each spread corresponding with an odd number of half-wavelengths at a predetermined seismic frequency different for the different spreads, combining and filtering the outputs of each pair of geophones to produce signals within a narrow band of frequencies including the frequency corresponding with the spacing of that pair and in which components due to horizontal waves are minimized because in phase opposition due to the spacing, and combining the signals of the corresponding pairs of geophones of the different spreads to produce a composite signal covering a wide band of seismic frequencies and corresponding with reflected waves to the substantial exclusion of horizontal waves.

CORNELIUS G. DAHM.

REFERENCES CITED

The following references are of record in the file of this patent:

UNITED STATES PATENTS

| Number | Name | Date |
|---|---|---|
| 1,672,495 | McCollum | June 5, 1928 |
| 1,959,004 | Owen | May 15, 1934 |
| 2,087,702 | Peters | July 20, 1937 |
| 2,279,191 | Adler | Apr. 7, 1942 |
| 2,348,409 | Parr | May 9, 1944 |

Certificate of Correction

Patent No. 2,473,469                                     June 14, 1949

CORNELIUS G. DAHM

It is hereby certified that errors appear in the printed specification of the above numbered patent requiring correction as follows:

Column 3, line 17, for the word "amplified" read *amplifier*; column 4, line 62, after "current" insert *voltage*; column 6, line 71, for "effeffct" read *effect*;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*